(12) United States Patent
Podhola

(10) Patent No.: US 12,344,364 B2
(45) Date of Patent: Jul. 1, 2025

(54) SAILING RIG SYSTEM

(71) Applicant: Kamil Podhola, Liberec (CZ)

(72) Inventor: Kamil Podhola, Liberec (CZ)

(*) Notice: Subject to any disclaimer, the term of this patent is extended or adjusted under 35 U.S.C. 154(b) by 659 days.

(21) Appl. No.: 17/592,960

(22) Filed: Feb. 4, 2022

(65) Prior Publication Data
US 2023/0249794 A1     Aug. 10, 2023

(51) Int. Cl.
*B63H 8/20* (2020.01)
*B63H 9/06* (2020.01)
*B63H 21/14* (2006.01)
*B63H 21/17* (2006.01)
*B63H 21/20* (2006.01)

(52) U.S. Cl.
CPC ............... *B63H 8/20* (2020.02); *B63H 9/06* (2013.01); *B63H 21/14* (2013.01); *B63H 21/17* (2013.01); *B63H 21/20* (2013.01)

(58) Field of Classification Search
CPC ... B63H 8/20; B63H 9/02; B63H 9/06; B63H 9/0621; B63H 9/0635; B63H 9/08; B63H 2009/105; B63H 9/1042; B63H 9/1092; B63H 9/1035; B63H 21/14; B63H 21/17; B63H 21/20; B63B 15/0083; B63B 2015/0041; B63B 2015/005; Y02T 70/5236
USPC ............ 114/39.11, 39.21, 39.3, 39.31, 39.32
See application file for complete search history.

(56) References Cited

U.S. PATENT DOCUMENTS

| | | | | |
|---|---|---|---|---|
| 4,602,584 | A * | 7/1986 | North .................... | F03D 80/70 416/4 |
| 8,875,643 | B2 * | 11/2014 | Rohden ................... | B63H 9/02 114/39.3 |
| 10,870,150 | B2 * | 12/2020 | DeMuth et al. ........ | B33Y 10/00 419/1 |
| 2016/0257388 | A1 * | 9/2016 | Holohan et al. ......... | B63H 9/02 |
| 2021/0221485 | A1 * | 7/2021 | Grunewald Mayer .. | G08G 3/02 |

FOREIGN PATENT DOCUMENTS

| | | | | |
|---|---|---|---|---|
| CN | 104085521 | B * | 8/2016 | ............... B63H 9/10 |
| CN | 104890845 | B * | 4/2017 | ........... B63H 9/0607 |
| CN | 113335485 | A * | 9/2021 | ............... B63H 9/10 |
| FR | 2624091 | A1 * | 9/1981 | ............... B63H 9/10 |
| JP | S56116593 | A * | 9/1981 | ............... B63H 9/10 |

* cited by examiner

*Primary Examiner* — Daniel V Venne

(57) ABSTRACT

The invention relates to a sailing rig system (SRS) for a sailing ship comprising one or more airfoil sails comprising one or more sail defining frames including at least three airfoil sail shape-defining edges and/or at least three airfoil sail shape-defining corners. The sail may be controllable, rotatable, pivotable, trimmable, reefable, stowable, slidable, windable, guidable, coaxial, weathervaning, wind/sun tracking, freestanding; it may provide cambering, reinforcing, sealing, boundary layer control, shielding means, sections and connections and it may be transparent. The frame may be a closable/deployable rotor sail frame. The frame may include rig components and the SRS may further comprise vertical/oblique/horizontal spars coupled with spar couplings. It may further comprise lateral, fore-and-aft, superposed sails, actuators, power generators, power sources, thermal management systems, defined rotor sails. It may provide sail twist. It may be coupled with a sailing ship with defined ship couplings. A sailing method is proposed.

19 Claims, 3 Drawing Sheets

SAILING RIG SYSTEM

TECHNICAL FIELD

The invention relates to a sailing rig system.

BACKGROUND ART

There is a wide range of sailing rig systems using flexible, airfoil and rotor sails. There is a wide range of sailing vessels and hybrid vessels which may have an improved ecological impact and may be one of sustainable forms of offshore transportation. Many people and companies are attracted to them because they want to decrease their personal impact on the environment through transport.

DISCLOSURE OF INVENTION

The object of the present invention is to propose a sailing rig system (SRS) for a sailing ship comprising one or more airfoil sails comprising one or more frames defining said one or more airfoil sails and including an upper horizontal spar and a lower horizontal spar and a first edge and a second edge, the edges defined as a leading edge or a trailing edge, the system characterized in that at least one of said one or more airfoil sails has a sail part reefable to a reefing edge, wherein said reefing edge is defined as said leading edge or said trailing edge, respectively and wherein said sail part is provided between said reefing edge and a mast.

The airfoil sail may be controllable, rotatable, pivotable, trimmable, reefable, stowable, slidable, windable, guidable, weathervaning, wind and/or sun tracking. It may be free-standing, provide cambering, reinforcing, sealing, boundary layer control means, provide sections and connections, be transparent, be defined as a sail type.

A further object is to propose the SRS with the frame including defined rig components.

A further object is to propose the SRS further comprising a spar couplable or coupled with defined spar couplings. Such systems may further comprise lateral, fore-and-aft, superposed sails and may provide sail twist. Such systems may comprise the sailing ship coupled with defined ship couplings. The sailing ship may be driven with defined drive systems.

A further object is to propose the SRS further comprising defined sail actuators, one or more defined sail parts which may be coupled with defined sail part actuators.

A further object is to propose the SRS further comprising defined power generators, defined rechargeable power sources/swappable rechargeable power sources, defined thermal management systems, one or more defined rotor sails.

A further object is to propose the SRS provided in a modular system.

A further object is to propose a sailing method for a sailing ship providing one or more airfoil sails according to the present invention and one or more rotor sails, the method comprising the steps of sailing upwind using said one or more airfoil sails; sailing downwind using said one or more airfoil sails;
  sailing across the wind using said one or more airfoil sails and/or said one or more rotor sails, wherein said steps can be combined and/or repeated.

In a first aspect, the invention discloses a sailing rig system for a sailing ship.

In a second aspect, the invention discloses a sailing method for a sailing ship.

BRIEF DESCRIPTION OF DRAWINGS

The invention will now be described by way of example. Only essential elements of the invention are schematically shown and not to scale to facilitate immediate understanding, emphasis being placed upon illustrating the principles of the invention.

BEST MODE FOR CARRYING OUT THE INVENTION

Figure 1:
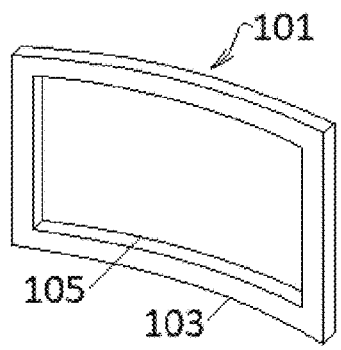
FIG. 1 is a schematic perspective illustration of an embodiment of a sailing rig system (SRS) for a sailing ship comprising a symmetric circular arc airfoil sail with a central flexible sail part, a frame defining the airfoil sail.

The following detailed description shows the best contemplated modes of exemplary embodiments. The description is made for the purpose of illustrating the general principles of the invention, and in such a detail that a skilled person in the art can recognise the advantages of the invention, and can be able to make and use the invention. However, it will be apparent to one of ordinary skill in the art that these specific details need not be used to practice the present invention. Well-known structures, materials, circuits, processes and interfaces have not been shown or described in detail in order not to unnecessarily obscure the present invention. The objects and advantages of this invention may be realized and obtained as pointed out in the appended claims. Advantageous embodiments are the subject of the description, the figures and the dependent claims. Additional advantages may be learned by practice of the invention. The detailed description is not intended to limit the principle of the presented invention, but only to show the possibilities of it. The description and the detailed description are exemplary and explanatory only.

The terms used in the claims and the specification shall refer to their synonyms as well.

The terms in the description [e.g. "an (automatic) control system"] put into parentheses show another variant, aspect, possibility, etc., of an element, feature, component, etc., of the invention.

As used in the claims and the specification, the term "sailing ship" shall preferably refer to any constructional type of an overwater (underwater) vessel at least partially propelled by sails in the proposed system and shall refer to hybrid boats, shall refer to sailboats, passenger ships, cargo ships, combinations [e.g. ferry boats], etc. The term shall also refer to land sailing vehicles. The term shall preferably refer to the vessels/vehicles at least partially electrically driven [e.g. using electric energy to rotate the rotating cylinders, to set sails, to trim sail rigs, to power an electric motor coupled with a propeller, including fuel cells, a hybrid power train, etc.] and shall also refer to the vessels/vehicles using electric energy for other systems [e.g. auxiliary, etc.].

As used in the claims and the specification, the term "line" shall preferably not exclusively refer to standing and/or running rigging.

As used in the claims and the specification, the term "guiding mean" shall preferably not exclusively refer to grooves, rails, wheels, and the like.

As used in the claims and the specification, the term "sealing mean" shall preferably not exclusively refer to shape sealing means, materials sealing means, and the like.

As used in the claims and the specification, the term "sensor" shall preferably not exclusively refer to proximity, velocity, position, thermal, time, orientation, sun position, wind direction, wind velocity sensors, and the like and the term shall refer to sensing circuits which can include processors, conductors, controllers, switches, electrocomponents, etc.

As used in the claims and the specification, the term "actuator" shall preferably not exclusively refer to mechanical, hydraulical, pneumatical, electromagnetical actuators, and the like.

As used in the claims and the specification, the term "spar" shall preferably not exclusively refer to vertical spars, horizontal spars, oblique spars, or combinations thereof. The term shall also refer to mast, yard, (spinnaker) pole, etc.

As used in the claims and the specification, the term "electric motor" shall refer to any constructional type inclusive of AC, DC motors, other motors /e.g. stepper motors, brushless motors, hysteresis motors, reluctance motors, universal motors, linear motors, etc./, jet engines, turbines, etc.

As used in the claims and the specification, the term "internal combustion engine" shall refer to any constructional type inclusive of hydrogen fuelled engines, hydrocarbon fuels fuelled engines, etc., and shall refer to reciprocating, rotary, continuous combustion engines as well.

As used in the claims and the specification, the term "motor generator" shall preferably not exclusively refer to electric energy generating systems using an electrical generator coupled with an engine [which can be a jet engine, an engine /e.g. using preferably not exclusively hydrogen gas, (organic) hydrogen liquid, compressed natural gases, liquefied natural gases, biofuels, low sulphur fuel oils, emulsified fuels, methanol, mixtures, hydrocarbon fuels/, a gas generator, a turbine, etc.], with an electric motor, with a device able to drive the motor generator [e.g. a hydro turbine, a propeller, etc.] and shall also refer to electric devices providing a function of an electric motor and of an electricity generator, and shall also refer to electric devices providing regenerative braking, and shall also refer to electric devices coupled with (output, input) shafts, gears, transmissions, clutches, driven wheels, etc., and shall also refer to the term "power plant", and the like, and shall also refer to mobile units, compact units, enclosed units, portable units, skid mounted units and shall also refer to thermal electric types and atomic types and shall also refer to floating and underwater types and shall also refer to power plants, power units comprising exhaust products (e.g. gases, fluids) treatments, and shall refer to alternators, alternator rectifiers, dynamos, etc.

As used in the claims and the specification, the term "swappable rechargeable power source" shall also refer to "first swappable rechargeable power source", "second swappable rechargeable power source" wherein said first swappable rechargeable power source and said second swappable rechargeable power sources are configured to be swappable/to be swapped at least for each other and wherein said sailing ship may provide said first swappable rechargeable power source and e.g. a transported at least partially electrically driven vehicle may provide said second swappable rechargeable power source, etc.

As used in the claims and the specification, the term "rechargeable power source/swappable rechargeable power source", "first swappable rechargeable power source", "second swappable rechargeable power source" shall preferably not exclusively refer to power sources including rechargeable batteries [e.g. strings, packs, modules, cells], capacitors [e.g. strings, packs, modules, cells], hybrid sources, energy storage elements [e.g. hydrocarbon fuel storage, mechanical (e.g. compressed air, compressed gas, flywheel, etc.), electromagnetical (e.g. using superconductors, etc.), electrochemical (e.g. flow battery, ultrabattery, etc.), thermal (e.g. phase change material, cryogenic energy storage, liquid nitrogen engine, etc.), chemical (e.g. biofuel storage, power to gas storage, power to liquid, hydrogen storage /e.g. condensed polycyclic hydrocarbons, metal hydrides, etc./, hydrogen peroxide, etc.); a number of hydrogen storage methods can be used: adsorptive, absorptive, as liquid /e.g. at very low temperatures and under high pressure/, as highly compressed gas.]. Rechargeable power sources can provide peak shaving, e.g. for optimum vehicle engine fuel consumption.

As used in the claims and the specification, the term "rechargeable battery" shall preferably not exclusively refer to lithium-ion, lithium-ion polymer, lithium-air, lithium-sulphur, lithium-metal, lithium iron phosphate, nickel-metal hydride, nickel-iron, nickel-cadmium, lead-acid, valve regulated lead-acid, absorbed glass mat, gel [e.g. for high pressure, high temperature implementations], solid state, organic radical batteries. Rechargeable batteries may include fuel cells, piezoelectric elements, springs. A variety of arrangements of multiple rechargeable batteries may be used. Rechargeable batteries may be trickle, float charged, charged at fast, slow rates, etc.

As used in the claims and the specification, the term "capacitor" shall preferably not exclusively refer to supercapacitors, ultracapacitors, double-layer capacitors (e.g. with activated carbons, carbon aerogels, carbon nanotubes, nanoporous carbon, graphene, carbid-derived carbon), pseudocapacitors (e.g. with polymers, metal oxides), hybrid capacitors (e.g. with asymmetric electrodes, lithium-ion capacitors, with composite electrodes), electrolytic capacitors (e.g. aluminium electrolytic capacitors), ceramic capacitors, mica capacitors, film capacitors, chip shape, lead shape capacitors, multilevel circuit board processed capacitors, etc.

As used in the claims and the specification, the term "thermal management system" shall refer to active and/or passive systems.

As used in the claims and the specification, the term "tempering systems using phase change materials" shall refer to systems using a pure phase change material (PCM) substance and to systems using methods for increasing the thermal conductivity (e.g. inserted fins, heat pipes; added fillers, foams, particles, nanostructures; metal/semimetal/nonmetal materials; carbon, graphite, graphene, composites), and to systems using dispersed/decentralised/microcapsule packaging.

As used in the claims and the specification, the term "tempering systems using heat pipes" shall also refer to systems using heat sinks, heat spreaders, vapor chambers, condensers, evaporators, etc., shall refer to compound cooling, natural convection cooling, and shall refer to systems using thermal conductance materials in any shape and form (e.g. tubes, foams, fibres, etc.) to transport, spread, dissipate, etc. heat/cold.

As used in the claims and the specification, the term "sail" shall refer to any constructional type and material inclusive of flexible sails, wing sails (airfoil, aerofoil, hydrofoil, rigid, semi-rigid), rotating cylinder sails, rotor sails, sail panels, lug sails, laminar flow shape sails, circular arc sails, layered sails, multipurpose sails, multifunctional sails, etc. The term "rotating cylinder sail" shall also refer to rotor sail, and the like, and the term "circular arc sail" shall refer to substantially symmetric sails which can or cannot provide an airfoil profile and which can at least partially provide circular arc profile. The term "circular" shall also refer to curved, parabolic, elliptical, flattened, oblate, 3D/2D modelled, and the like.

As used in the claims and the specification, the term "flexible sail" shall refer to sails typically consisting of flexible and pliable sail materials, and the like, which can be provided as solitary sails or in combinations, rigs, etc.

As used in the claims and the specification, the term "airfoil sail" (or "wing sail") shall refer to sails typically providing at least partially self-supporting, (semi-) rigid constructions [e.g. masts, spars, ribs, camber inducers /mechanical, pneumatic, etc./, panels, flaps, fins, etc.] which can provide one or more sail walls (covers, flaps, etc.) which can be soft [e.g. from flexible material /monofilm, sail cloth, etc./], (semi-) rigid [e.g. from panels, flaps, screens, etc.] materials and which can be shaped to one or more (variable) airfoil contours. The wing sails can or cannot form cavities, can have two surfaces of curvatures or a single (thin) surface. The wing sails can be pivotable, rotatable, arcuately displaceable, pliable, foldable, collapsible, reefable, wrappable, windable, retractable [e.g. into itself, into a hull, a superstructure, etc.], extendable, telescopic, divided into subsections. The wing sails can be provided in (multi-element wing sail) rigs, arrays, combinations, etc., wherein subsections and rigs can be individually controllable. The term shall refer to aerofoil sail, airfoil sail, rigid sail, and the like. The term shall refer to longitudinally (spanwise), transversally (chordwise) symmetric and assymetric sails and shall refer to profile sails including a sail face being at least partially an airfoil profile which can be substantially nondeformable under exposure to wind. The term shall refer to sails including one or more leading and trailing edges, panels, flaps, etc. The term shall refer to sails which can adjust its angle of attack to the wind. The sails may be surfaced with non-stick, non-wetting materials.

As used in the claims and the specification, the term "rotating cylinders" as in "rotating cylinders sails", shall refer to preferably hollow cylinder bodies of various preferably light-weight materials [e.g. (marine-grade) aluminium, steel, polymers, (light-weight) resin, composite materials /e.g. (fiber) glass, reinforced plastics, carbon fiber reinforced plastics, aramid reinforced plastics, basalt reinforced plastics, etc./, wood, fabric /e.g. woven from natural fibers, synthetic fibers/, sandwich structures, etc.] which can have closed lateral surfaces (cylinder walls), cylinder walls with (internal/external) (cooling, air propelling) (axially/radially extending) blades, fins, surface roughening means, functional (weight reduction, cooling, etc.) openings, vents, etc., shall refer to cylinders with tangential flow, cylinders with cross-flow (transverse flow), hybrid cylinders including tangential and cross-flow cylinders, cylinders making a fan, cylinders with (movable, controllable, vortex-generating) flaps, blades, (partially) shrouded cylinders, etc. The term shall also refer to (truncated) cones and cone segments or cylinder segments and to various rotation-symmetric shapes [inclusive of tapered, spindle, spherical, etc., shapes and shapes with variable diameters, etc.] and shall refer to oblate shapes. The term shall also refer to cylinders having or being provided with one or more end plates projecting over the cylinder surface. The term shall refer to rotating cylinders with various (variable) rpms (revolutions per minute) and (reversible) senses of a rotation. The term shall refer to rotating cylinders with an axis of rotation in an arbitrary direction [e.g. vertical, horizontal, inclined]. The rotating cylinders can rotate at various speeds [e.g. up to 250 rpm].

The flexible sails, wing sails and the rotating cylinder sails can generate propelling, braking, maneuvering and lifting forces. The sails can include various (regulable) apertures, slots, gaps, holes, channels, vents, etc., in various proportions, sizes, quantities, patterns [e.g. row, columns, arrays, etc.] for venting on sails and providing high energy air flow from windward side through to the leeward side to maintain laminar air flow over a sail and to prevent a boundary layer air to separate from a surface. These apertures and flow providing constructions can be in the present invention constructionally coupled with provided arrays of solar cells, wind energy to electric energy converters coupled with a respective sail and redirecting air flow without inducing additional drag.

As used in the claims and the specification, the terms "extendable/retractable sails", "twistable sails", "stowable sails", "tiltable sails", "rotatable sails", "pivotable sails", and the like shall also refer to at least partially extendable/retractable sails, etc.

As used in the claims and the specification, the term "square rig sail" shall refer to flexible, semi-rigid, rigid sails provided on axes, which are perpendicular or at angle to substantially vertical spars or masts, the axes can be preferably not exclusively spars, yards, stowing axes, variable cambering axes, spinning axes, rotatable axes, the term shall refer to running rigs enabling downwind sailing.

As used in the claims and the specification, "A/B" shall refer to A and/or B.

As used in the claims and the specification, the singular forms are intended to include the plural forms as well.

The term "to couple" and derivatives shall refer to a direct or indirect connection via another device and/or connection, such a connection can be mechanical, hydraulic, electrical, electronical, electromagnetical, pneumatical, communication, functional, etc., the term shall also refer to attach, detach, detachably attach, mount, connect, fix, join, support, link, bear, fasten, secure, tie, tether, chain, screw, weld, bond, solder, etc. Similarly as far as the term "coupling" concerned.

The terms "to comprise", "to include", "to contain", "to provide" and derivatives specify the presence of an element, but do not preclude the presence or addition of one or more other elements or groups and combinations thereof.

The term "consisting of" characterises a Markush group which is by nature closed. Single members of the group are alternatively useable for the purpose of the invention. Therefore, a singular if used in the Markush group would indicate only one member of the group to be used. For that reason are the countable members listed in the plural. That means together with qualifying language after the group "or combinations thereof" that only one member of the Markush group can be chosen or any combination of the listed members in any numbers. In other words, although elements in the Markush groups may be described in the plural, the singular is contemplated as well. Furthermore, the phrase "at least one" preceding the Markush groups is to be interpreted that the group does not exclude one or more additional elements preceded by the phrase.

The invention will be described in reference to the accompanying drawings.

FIG. 1 is a schematic perspective illustration of an embodiment of a sailing rig system for a sailing ship comprising a symmetric circular arc airfoil sail (101) further comprising a central flexible sail part (105); a frame (103) defining the airfoil sail (101) and including airfoil sail shape-defining leading, trailing, top and bottom edges.

Figure 2:
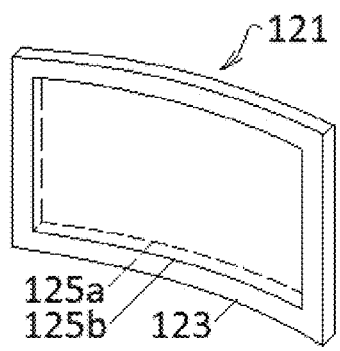
FIG. 2 is a schematic perspective illustration of another embodiment of the SRS with central (semi-) rigid sail parts.

FIG. 2 is a schematic perspective illustration of another embodiment of the sailing rig system for a sailing ship comprising a symmetric circular arc airfoil sail (121) further comprising central (semi-) rigid sail parts (125a, 125b); a frame (123) defining the airfoil sail and including airfoil sail shape-defining edges.

Figure 3:
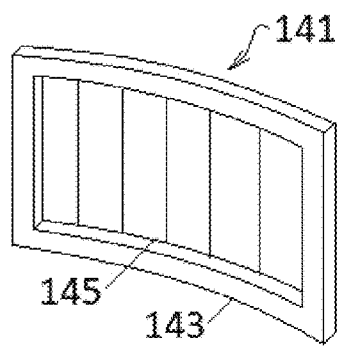
FIG. 3 is a schematic perspective illustration of another embodiment of the SRS providing sections and connections.

FIG. 3 is a schematic perspective illustration of another embodiment of the sailing rig system for a sailing ship comprising a controllable trimmable reefable symmetric circular arc airfoil sail (141) providing sections and connections forming a central controllable trimmable reefable stowable slidable (semi-) rigid sail part (145); a frame (143) defining the airfoil sail and including airfoil sail shape-defining edges.

Figure 4:
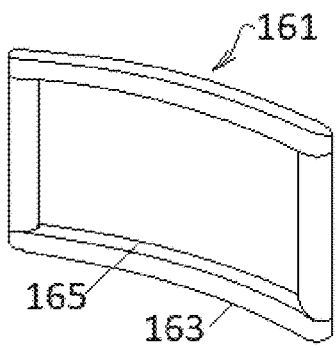
FIG. 4 is a schematic perspective illustration of another embodiment of the SRS with an aerodynamic frame.

FIG. 4 is a schematic perspective illustration of another embodiment of the sailing rig system for a sailing ship comprising a symmetric circular arc (semi-) rigid airfoil sail (161) further comprising a central (semi-) rigid sail part (165); an aerodynamic frame (163) defining the airfoil sail and including airfoil sail shape-defining edges.

Figure 5:
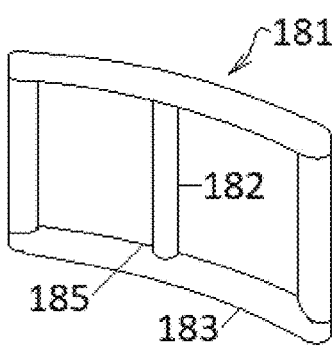
FIG. 5 is a schematic perspective illustration of another embodiment of the SRS providing a reinforcing mean.

FIG. 5 is a schematic perspective illustration of another embodiment of the sailing rig system for a sailing ship comprising a symmetric circular arc airfoil sail (181) providing a reinforcing mean (182) and further comprising a central flexible sail part (185); an aerodynamic frame (183) defining the airfoil sail and including airfoil sail shape-defining edges.

Figure 6:
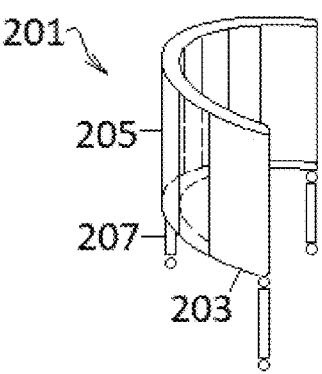
FIG. 6 is a schematic perspective illustration of another embodiment of the SRS providing sections and connections and an aerodynamic frame.

FIG. 6 is a schematic perspective illustration of another embodiment of the sailing rig system for a sailing ship comprising a controllable rotatable reefable symmetric circular arc airfoil sail (201) providing sections and connections forming a central controllable trimmable reefable stowable slidable (semi-) rigid sail part (205); an aerodynamic frame (203) defining the airfoil sail and including airfoil sail shape-defining leading, trailing, top and bottom edges; the system coupled with a sailing ship with a controllable rotatable pivotable trimmable weathervaning sun and wind tracking freestanding ship coupling (207).

Figure 7:
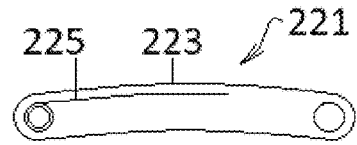
FIG. 7 is a schematic sectional plan view of another embodiment of the SRS providing a section and connections.

FIG. 7 is a schematic sectional plan view of another embodiment of the sailing rig system for a sailing ship comprising a controllable trimmable reefable symmetric circular arc airfoil sail (221) providing a section and connections forming a central controllable trimmable reefable windable symmetric circular arc flexible sail part (225); a frame (223) defining the airfoil sail and including airfoil sail shape-defining leading, trailing, top and bottom edges which can be rig components providing controlling, trimming, reefing, winding means, sensors and actuators.

Figure 8:
FIGS. 8 and 9 are schematic horizontal sectional views of variants of the embodiment shown in FIG. 7.
Figure 9:
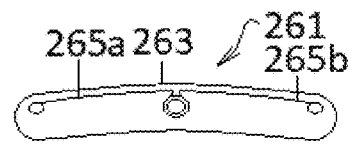

FIGS. 8 and 9 are schematic horizontal sectional views of variants of the embodiment shown in FIG. 7. An airfoil sail (241) providing sections and connections forming lateral controllable trimmable reefable windable symmetric circular arc flexible sail parts (245a, 245b) [a side reefing system]; a frame (243). An airfoil sail (261) providing sections and connections forming lateral controllable trimmable reefable windable symmetric circular arc flexible sail parts (265a, 265b) [a central reefing system]; a frame (263).

Figure 10:
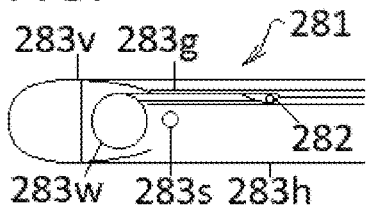
FIG. 10 is a schematic detailed horizontal sectional view of another embodiment of the SRS providing a reinforcing mean, a sealing mean, a section and connections and an aerodynamic frame.

FIG. 10 is a schematic detailed horizontal sectional view of another embodiment of the sailing rig system for a sailing ship comprising a controllable trimmable reefable circular arc airfoil sail (281) providing a reinforcing mean (282), a sealing mean (283g), a section and connections forming a central controllable trimmable reefable stowable windable guidable flexible sail part; an aerodynamic frame defining the airfoil sail and including airfoil sail shape-defining leading, trailing, top and bottom edges which can be rig components: a hollow vertical spar (283v) providing controlling trimming reefing winding means (283w), stowing means and a sail part actuator; a horizontal spar (283h) providing guiding and sealing means (283g), a sensor (283s).

Figure 11:
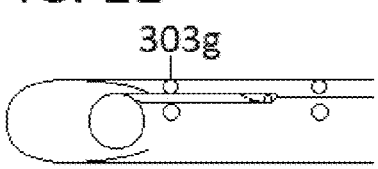
FIGS. 11 and 12 are schematic detailed horizontal sectional views of variants of the embodiment shown in FIG. 10.

FIG. 11 is a schematic detailed horizontal sectional view of a variant of the embodiment shown in FIG. 10 wherein a rig component provides another guiding mean (303g).

Figure 12:
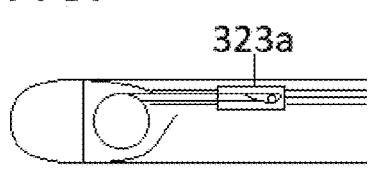

FIG. 12 is a schematic detailed horizontal sectional view of a variant of the embodiment shown in FIG. 10 wherein a rig component provides another sail part actuator (323a) [which can be a sail car].

Figure 13:
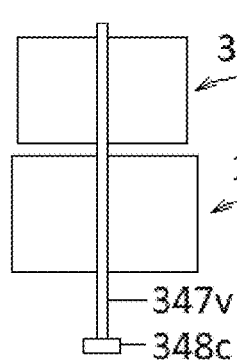
FIG. 13 is a schematic front view of another embodiment of the SRS coupled with a vertical spar and comprising a superposed airfoil sail.

FIG. 13 is a schematic front view of another embodiment of the sailing rig system for a sailing ship comprising a controllable rotatable trimmable weathervaning freestanding symmetric square airfoil sail (341) coupled with a vertical spar (347v) with a defined degree of freedom spar coupling; the system to be coupled with a sailing ship with a controlling rotating trimming weathervaning freestanding ship coupling (348c); the sailing rig system further comprises an analogical scaled down superposed airfoil sail (341s).

Figure 14:
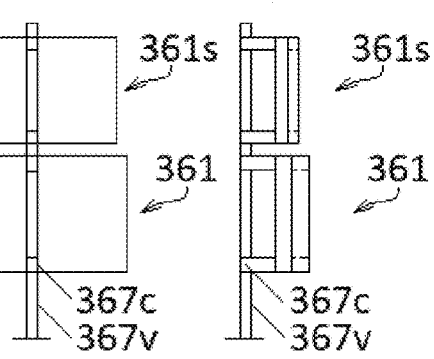
FIG. 14 is a schematic front view of another embodiment of the SRS providing sail twist.

FIG. 14 is a schematic front view of another embodiment of the sailing rig system for a sailing ship comprising a controllable rotatable trimmable weathervaning freestanding symmetric circular arc airfoil sail (361) providing sail twist and coupled with a vertical spar (367v) with a controlling rotating trimming weathervaning spar coupling (367c); the sailing rig system coupled with a sailing ship with a defined degree of freedom ship coupling [the vertical spar (367v) can be coupled at its foot and at its head /e.g. with stays, etc./]; the sailing rig system further comprises an analogical scaled superposed airfoil sail (361s).

Figure 15:
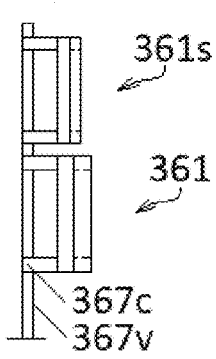
FIG. 15 is a schematic side view of the embodiment shown in FIG. 14.

FIG. 15 is a schematic side view of the embodiment shown in FIG. 14.

Figure 16:
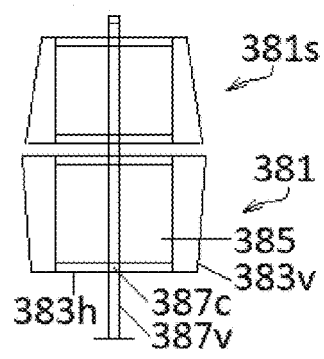
FIG. 16 is a schematic front view of another embodiment of the SRS with an aerodynamic frame, aerodynamic rig components and a superposed airfoil sail.

FIG. 16 is a schematic front view of another embodiment of the sailing rig system for a sailing ship comprising a controllable rotatable trimmable reefable weathervaning freestanding symmetric square tapered airfoil sail (381) further comprising a central controllable trimmable reefable windable sail part (385); an aerodynamic frame including airfoil shape-defining leading, trailing, top and bottom edges which can be aerodynamic rig components: a vertical spar (383v) providing trimming reefing winding means, a horizontal spar (383h) providing guiding means; the airfoil sail (381) being coupled with a vertical spar (387v) with a with a controlling rotating trimming weathervaning spar coupling (387c), the sailing rig system to be coupled with a sailing ship with a defined degree of freedom ship coupling; the sailing rig system further comprises an analogical superposed airfoil sail (381s).

Figure 17:
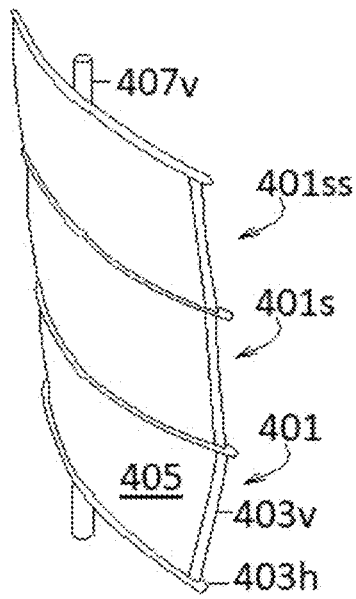
FIG. 17 is a schematic perspective illustration of another embodiment of the SRS providing sail twist and comprising superposed airfoil sails.

FIG. 17 is a schematic perspective illustration of another embodiment of the sailing rig system for a sailing ship comprising a controllable rotatable trimmable reefable weathervaning freestanding symmetric square flexible airfoil sail (401) further comprising a central controllable trimmable reefable stowable windable flexible sail part (405) and providing sail twist; an aerodynamic frame including airfoil shape-defining leading, trailing, top and bottom edges which can be aerodynamic rig components: a vertical spar (403v) providing coupling means; a horizontal spar (403h) providing controlling means, guiding means, scaling means, a sensor, an actuator; the airfoil sails being coupled with a vertical spar (407v) with a controlling rotating trimming weathervaning spar coupling (not shown); with a reefing stowing winding spar coupling (not shown), the sailing rig system further comprises analogical superposed airfoil sails (401s, 401ss).

Figure 18:
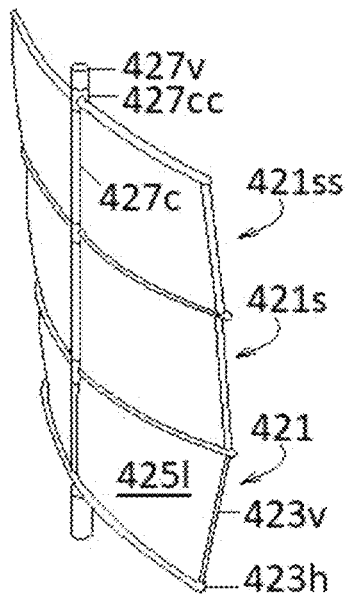
FIG. 18 is a schematic perspective illustration of another embodiment of the sailing rig system for a sailing ship providing sail twist and comprising superposed airfoil sails.

FIG. 18 is a schematic perspective illustration of another embodiment of the sailing rig system for a sailing ship comprising a controllable rotatable trimmable reefable weathervaning freestanding symmetric square flexible airfoil sail (421) further comprising lateral controllable trimmable reefable stowable windable flexible sail parts (4251) and providing sail twist; an aerodynamic frame including airfoil shape-defining leading, trailing, top and bottom edges which can be aerodynamic rig components: a vertical spar (423v) providing coupling means; a horizontal spar (423h) providing controlling means, guiding means; the airfoil sails being coupled with a vertical spar (427v) with a controlling trimming reefing winding spar coupling (427c) and with a controlling rotating trimming weathervaning spar coupling (427cc); the sailing rig system further comprises analogical superposed airfoil sails (421s, 421ss).

Figure 19:
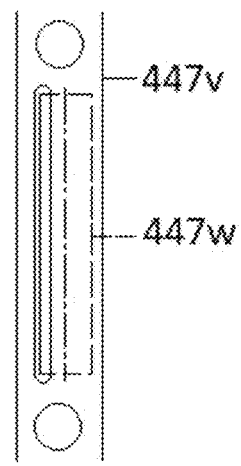
FIG. 19 is a schematic detailed side view of a vertical spar rig component providing trimming reefing winding stowing means.

FIG. 19 is a schematic detailed side view of a vertical spar rig component (447v) providing trimming reefing winding stowing means (447w).

Figure 20:
FIG. 20 is a is a schematic detailed partial sectional plan view of an embodiment.

FIG. 20 is a is a schematic detailed partial sectional plan view of an embodiment wherein a vertical spar (503vv) provides trimming reefing winding means.

Figure 21:
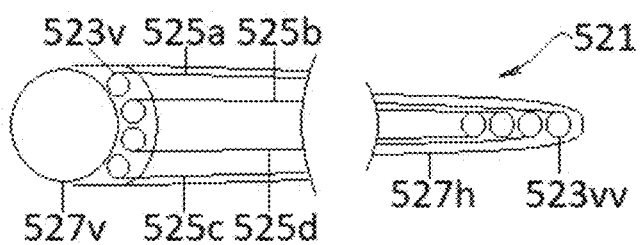
FIG. 21 is a schematic detailed partial sectional plan view of a multiple-layers airfoil sail.

FIG. 21 is a schematic detailed partial sectional plan view of a controllable rotatable trimmable reefable weathervaning freestanding asymmetric quadrilateral flexible multiple-layers airfoil sail (521) comprising central controllable trimmable reefable stowable windable flexible sail parts (525a, 525b, 525c, 525d); a frame including airfoil shape-defining leading, trailing, top and bottom edges which can be aerodynamic rig components: a vertical spar (523v) providing trimming reefing winding means; a vertical spar (523vv) providing trimming reefing winding means, stowing means; a horizontal spar (527h) providing sealing means, guiding means, sensors and actuators; the airfoil sails being coupled with a vertical spar (527v) with a controlling rotating trimming weathervaning spar coupling.

Figure 22:
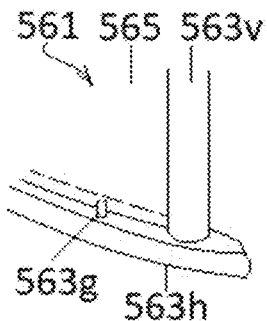
FIG. 22 is a schematic detailed perspective illustration of a lateral section of an airfoil sail.

FIG. 22 is a schematic detailed perspective illustration of a lateral section of a controllable trimmable reefable symmetric square flexible airfoil sail (561) comprising a controllable trimmable reefable stowable windable flexible sail part (565); an aerodynamic frame including airfoil shape-defining leading, trailing, top and bottom edges and further including aerodynamic rig components: a vertical spar (563v) at the leading/trailing edge providing controlling trimming reefing sliding guiding coupling means; a horizontal spar (563h) providing controlling means, guiding means (563g), sensors.

Figure 23:
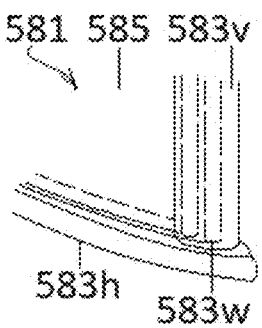
FIG. 23 is a schematic detailed perspective illustration of a lateral section of a multiple-layers airfoil sail.

FIG. 23 is a schematic detailed perspective illustration of a lateral section of a controllable trimmable reefable symmetric square flexible multiple-layers airfoil sail (581) comprising a controllable trimmable reefable stowable windable flexible sail part (585); an aerodynamical frame including airfoil shape-defining leading, trailing, top and bottom edges and further including aerodynamic rig components: a vertical spar (583v) at the leading/trailing edge providing controlling trimming reefing winding means (583w); a horizontal spar (583h).

Figure 24:
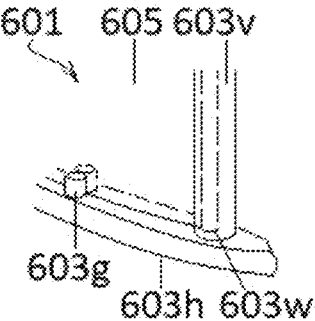
FIG. 24 is a schematic detailed perspective illustration of a lateral section of an airfoil sail.

FIG. 24 is a schematic detailed perspective illustration of a lateral section of a controllable trimmable reefable symmetric square flexible airfoil sail (601) comprising a controllable trimmable reefable stowable windable flexible sail part (605); an aerodynamical frame including airfoil shape-defining leading, trailing, top and bottom edges and further including aerodynamic rig components: a vertical spar (603v) at the leading/trailing edge providing controlling trimming reefing winding means (603w); a horizontal spar (603h) providing guiding means (603g).

Figure 25:
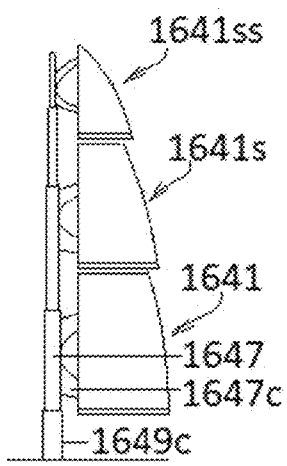
FIG. 25 is a schematic side view of another embodiment of the SRS with a rotatable pivotable rigid airfoil sail providing reinforcing means and sail twist and coupled with a stowable vertical spar.

FIG. 25 is a schematic side view of another embodiment of the sailing rig system for a sailing ship comprising a controllable rotatable pivotable trimmable reefable stowable slidable guidable weathervaning wind and sun tracking freestanding transparent symmetric circular arc rigid airfoil sail (1641) providing reinforcing means and sail twist; an aerodynamic frame defining the airfoil sail and including airfoil sail shape-defining leading, trailing, top and bottom edges; the airfoil sail being coupled with a vertical spar (1647) with a controlling rotating pivoting trimming reefing stowing sliding guiding coaxial defined degrees of freedom spar coupling (1647c); the system to be coupled with a sailing ship with a defined degrees of freedom ship coupling (1649c); the sailing rig system further comprises analogical superposed airfoil sails (1641s, 1641ss) and an array of solar cells.

Figure 26:
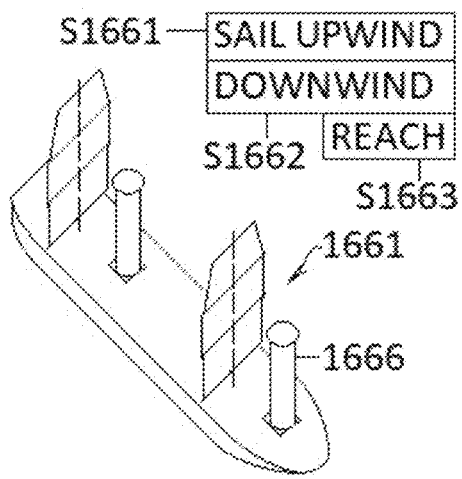
FIG. 26 is a schematic perspective illustration and functional diagram of a sailing method for a sailing ship providing two airfoil sails and two rotor sails.

FIG. 26 is a schematic perspective illustration and functional diagram of a sailing method for a sailing ship providing two airfoil sails (1661) according to the present invention and two rotor sails (1666), the method comprising the steps of: sailing upwind (S1661) using said one or more airfoil sails (1661); sailing downwind (S1662) using said one or more airfoil sails (1661); sailing across the wind (S1663) using said one or more airfoil sails (1661) and/or said one or more rotor sails (1666), wherein said steps can be combined and/or repeated.

Figure 27:
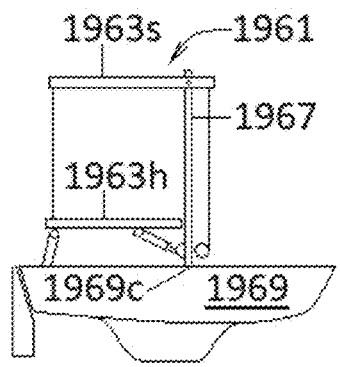
FIG. 27 is a schematic front view of another embodiment of the SRS with an airfoil sail and horizontal spars providing trimming means.

FIG. 27 is a schematic front view of another embodiment of the sailing rig system for a sailing ship comprising a controllable rotatable trimmable reefable airfoil sail (1961) (shown in a deployed position); a frame defining the airfoil sail and including airfoil sail shape-defining leading, trailing, top and bottom edges and including rig components: a superposed horizontal spar (1963s) providing trimming means; a horizontal spar (1963h) providing trimming means, reefing means; a vertical spar (1967) providing trimming means, reefing means, sliding means; the airfoil sail (1961) being coupled with the vertical spar (1967) with a rotating trimming spar coupling and with a controlling rotating trimming spar coupling, lines; the system further comprises a sailing ship (1969) coupled with a controlling rotating ship coupling (1969c); (the sailing rig system can further comprise an array of solar cells).

Figure 28:
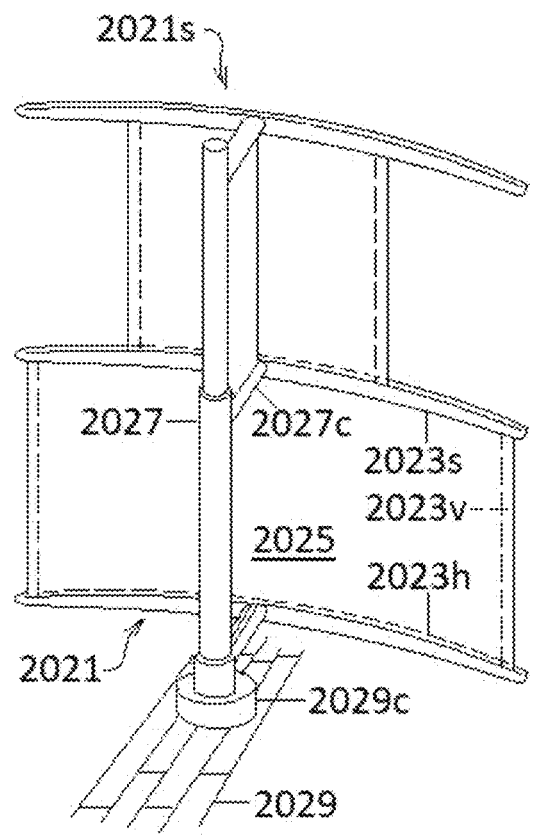
FIG. 28 is a schematic perspective illustration of a SRS according to previous art and with a freestanding airfoil sail providing sections and connections forming a central windable flexible sail part and providing sail twist, the system comprises an analogical superposed airfoil sail.

FIG. 28 is a schematic perspective illustration of a sailing rig system for a sailing ship according to previous art and comprising a controllable rotatable trimmable reefable freestanding airfoil sail (2021) (shown in a deployed position) providing sections and connections forming a central controllable trimmable reefable stowable windable guidable flexible sail part (2025) and providing sail twist; a frame defining the airfoil sail and including airfoil sail shape-defining leading, trailing, top and bottom edges and including rig components: a superposed horizontal spar (2023s) and a horizontal spar (2023h) providing controlling trimming reefing sliding guiding means; bolt rope, layered components (2023v); components providing sensors, components providing actuators; the airfoil sail (2021) being coupled with a vertical spar (2027) with a defined degrees of freedom spar coupling (2027c) and with a controlling rotating trimming reefing stowing sliding guiding spar coupling; the system further comprises a sailing ship (2029) coupled with a controlling rotating trimming weathervaning ship coupling (2029c); the sailing rig system further comprises an analogical superposed airfoil sail (2021s) (shown in a partially stowed position); (the sailing rig system can further comprise an array of solar cells).

Figure 29:
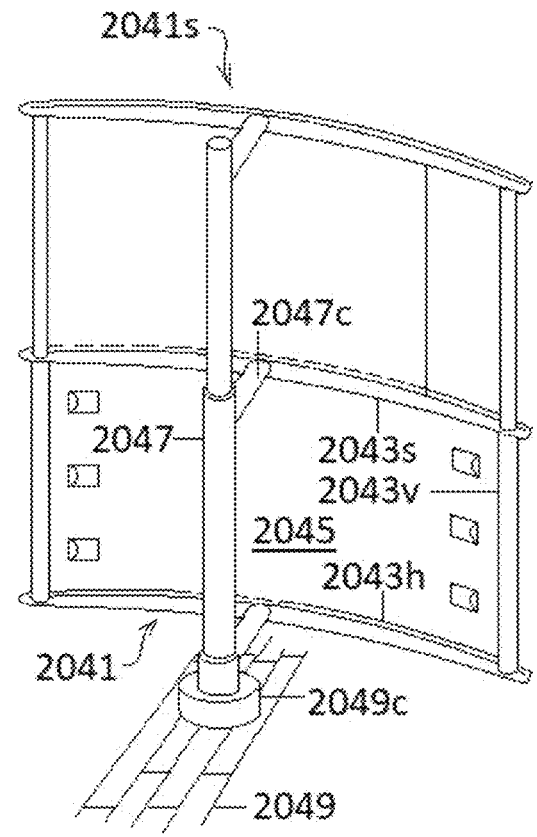
FIG. 29 is a schematic perspective illustration of another embodiment of the SRS with a freestanding airfoil sail providing sections and connections forming a central/lateral sail part and providing sail twist, the system comprises an analogical superposed airfoil sail, the system provides boundary layer control.

FIG. 29 is a schematic perspective illustration of another embodiment of the sailing rig system for a sailing ship comprising a controllable rotatable trimmable reefable freestanding airfoil sail (2041) (shown in a deployed position) providing sections and connections forming a central/lateral controllable trimmable reefable stowable windable guidable flexible sail part (2045) and providing sail twist; a frame defining the airfoil sail and including airfoil sail shape-defining leading, trailing, top and bottom edges and including rig components: a superposed horizontal spar (2043s) and a horizontal spar (2043h) providing controlling trimming reefing sliding guiding means; vertical spars (2043v) providing controlling trimming reefing stowing winding means, components providing sensors, components providing actuators; the airfoil sail (2041) being coupled with a vertical spar (2047) with a defined degrees of freedom spar coupling (2047c); the system further comprises a sailing ship (2049) coupled with a controlling rotating trimming weathervaning ship coupling (2049c); the sailing rig system further comprises an analogical superposed airfoil sail (2041s) (shown in a laterally partially stowed position); (the sailing rig system can further comprise an array of solar cells).

Common features of drawings.

Arrays of solar cells can be solar panels [e.g. monocrystalline, polycrystalline, thin-film /e.g. silicon nitride/, amorphous silicon, biohybrid, cadmium telluride, etc.], solar modules, solar towers, solar concentrators [e.g. inclusive of fresnel lens, parabolic mirrors], etc. The solar panels can be flexible, foldable, extendable, incorporated into the "construction" of the SRS, detachably attachable to the "construction" of the SRS, mounted, laminated, coupled, etc. to a surface, provide azimuth/elevation solar tracking, etc.

Hydrogen power units providing electrolysers and/or fuel cells can include hydrogen production units and hydrogen storage units. Hydrogen production units can be electrolysis systems [e.g. alkaline, solid oxide, microbial, proton exchange membrane, photo-electrochemical electrolysis systems, etc.], hydrocarbons reforming systems, alcohols reforming systems, sugars reforming systems, chemical processing systems, biological processing systems, biomass processing systems, thermal processing systems, photo processing systems, metal and water systems, etc. Hydrogen storage units can be compressed gas systems, liquified gas systems, chemical systems, electrochemical systems, physisorption systems, nanomaterial systems, intercalation in metals systems, intercalation in hydrides systems, inorganic gaseous systems, inorganic liquids systems, inorganic solids systems, organic gaseous systems, organic liquids systems, organic solids systems, etc. Fuel cells can be polymer electrolyte membrane, direct methanol, alkaline, phosphoric acid, molten carbonate, solid oxide, reversible, etc.

Wind energy to electric energy converters can be preferably but not exclusively wind turbines [e.g. horizontal axis, vertical axis, variable axis, etc.].

The rechargeable power sources/swappable rechargeable power sources can be used for proper needs of the sailing ships [e.g. propelling systems, auxiliary systems, heating, ventilation and air conditioning (HVAC) systems, etc.], can be used for purposes of (hybrid) electric vehicles transported by the sailing ship and charged when onboard or swapping the swappable rechargeable power sources of the transported onshore vehicles, or can be used for other purposes, or combinations.

The rechargeable power sources/swappable rechargeable power sources, can include a package [e.g. a container, a climatised container, a waterproof, watertight, buoyant container, pressurised package, etc.], include and/or be coupled with a source management system which can include power electronics, communication interfaces, various circuit topologies including electrocomponents such as converters, inverters, voltage regulators, power factor corrections, rectifiers, filters, controllers, processors, etc. The source management systems can provide monitoring [e.g. State of Charge (SoC), etc.], calculating, reporting, cell balancing, controlling, etc., functions with regard to the energy management. The source management system can include energy management processors, databases, position identification system [e.g. global positioning satellite (GPS) system receivers] and provide intelligent source management using anticipated cruise conditions, charging opportunities, past operating experience, etc.

The rechargeable power sources/swappable rechargeable power sources, can include an energy storage element including a complex technology [e.g. including energy storage, energy transfer, energy harvesting, energy generating, etc.] which can include power electronics, communication interfaces, various circuit topologies, etc. The rechargeable power sources/swappable rechargeable power sources, the first/second swappable rechargeable power sources can be mobile units, compact units, enclosed units, portable units, skid mounted units, and the like.

The swappable rechargeable power sources, can comprise a functional, communication, shape compatibility [e.g. can comprise compatible power transfer interfaces, compatible communication interfaces, compatible rechargeable power sources, compatible source management systems, power cables, thermal management systems, etc.]. The sailing ship can be arranged for easy, frequent and rapid swapping of the swappable rechargeable power source, [e.g. the sources can be charged/discharged, prepared, stocked, etc. for a ferryboat at a port, etc.].

The SRS can provide thermal management systems which can be included by the sailing ships and/or located on shore/off shore and coupled with the sailing ships at ports to thermally manage charging and/or discharging the rechargeable power sources/swappable rechargeable power sources. The systems can thermally manage the power generators, chargers of charging stations, charging cables, charging interfaces, rechargeable batteries and/or capacitors and/or energy storage elements of the power sources, etc. The thermal management systems of energy storage elements can include complex technologies. The systems can include ventilators, thermal exchangers, compressors, chillers, condensers, heaters, sensors, pumps, programmable controllers, thermal medium conducts, valves, heat pipes, vapor chambers, heat sinks, fillers, etc. The systems can use thermal exchange with (offshore) water, air, ground, etc.

Various airfoil sails, rotating cylinder sails, or combined systems (rigs) can be provided in the proposed SRS [e.g. adjustable/nonadjustable, symmetric/asymmetric, tapered/non tapered, twisted/straight, concave, convex, flat, fixed/variable (reflex) (under) camber, NACA profiles (National Advisory Committee for Aeronautics), airfoil sails provided as isolated sails or in combination /e.g. various rig types, etc.]. An outer skin of airfoil sails can consist of (marine-grade) aluminium, steel, polymers, (light-weight) resin, composite materials [e.g. (fiber) glass, reinforced plastics, carbon fiber reinforced plastics, aramid reinforced plastics, basalt reinforced plastics, etc.], wood [e.g. plywood], fabric sail [e.g. woven from natural fibers such as flax, hemp, cotton or woven from synthetic fibers such as nylon, dacron, aramid, polyethylene, polyester, polyazole or carbon], sandwich structures, etc., with a combination of construction materials for masts, (longitudinal/transversal) spars, (transversal) ribs, battens, rotatable, pivotable, tiltable constructions, etc., which can be from metal alloys [e.g. high strength steel, aluminium alloys], carbon fiber, wood, etc., and which can include various actuators [e.g. (toothed) (bevel) gears, geared motors, racks, pinions, sprockets, drive cogs, toothed collars, winches, chains, ropes, etc.] with hydraulic pressure source, electrical pressure source, etc. The rotating cylinders of rotating cylinder sails can be preferably of a light-weight material to reduce gyroscopic effect and minimise energetic demands [e.g. light-weight alloys, fiber technologies materials, etc.] and can be rotated by a plurality of drive arrangements [e.g. including electric motors, gears, belts, chains, upper/lower bearing/supporting arrangements, external/internal drive arrangements, etc.] with ventilating and cooling systems [e.g. inner/outer cooling blades, fins, etc.]. The outer surface of the cylinders can be smooth or provided with air flow accelerating means [e.g. (micro) blades, rough surface, etc.].

The provided arrays of solar cells can make profit of proposed to wind exposed positions on flexible sails, wing sails, shieldings and/or rotating cylinders wherein air currents effectively cooling solar panels can boost their solar efficiency. The systems can be provided with controllers using feedback signals from (wind, load, etc.) sensors, etc., to determine the angle of attack for the sail, the shape of an airfoil, etc. A visual control using telltales streaming can be provided.

Flexible sails can be comprised of fabric sails [e.g. woven from natural fibers such as flax, hemp, cotton or synthetic fibers such as nylon, dacron, aramid, polyethylene, polyester, polyazole or carbon], films [e.g. BoPET /Biaxially-oriented polyethylene terephthalate/, Monofilm, etc.], sandwiched materials [e.g. x-ply, etc.]. A Bermuda sloop was used to explain possibilities of the invention. Other rig types can be used [e.g. Ketch, Cutter, Gaff, Full-rigged, etc.]. The flexible sail riggings can include masts, booms, yards, lines, standing rigging [e.g. stays, shrouds, etc.] and running rigging [e.g. halyards, downhauls, sheets, guys, etc.].

Combined flexible & airfoil sail rigs or flexible & rotating sail rigs or airfoil & rotating sail rigs can provide an improved driving force than non-combined rigs solutions. Such rigs can provide an effective possibility of downwind and reach or hauled sailing.

Various airfoil sails can provide vertical sections and connections which can vary in dimensions and can be controllable and rotatably mounted on a vertical mast, spar, etc. to provide sail twist. The sections and the connections can include and/or be coupled with various actuators [e.g. electric motors, electromagnetic actuators, lines, etc.].

The airfoil sails can provide solar panels which may not be extendable. The sails thus can provide sections and extendable connections wherein the solar panels can be preferably positioned at the sections between the adjacent connections. The sections and the connections can be provided in transversal and/or longitudinal directions. The sails can provide shapeable airfoil surfaces providing arrays of solar cells. Such a solar skin can be provided of relatively small (flexible) solar panels of various geometrical shapes [e.g. polygon shapes] layered on a flexible, extendable, (slip) joint means substrate, etc. [e.g. similarly to scales on snake skin]. The solar skin can be further coupled [bound, layered, pasted, etc.] with a respective sail surface.

Common Requirements on the SRS in Cold Areas

The SRS can be provided in the Arctic, the Antarctic, subpolar, cold areas. In that case, system elements components can be designed to be conform with cold, extremely cold, temporarily cold conditions. Charging interfaces can be specifically designed to be protected against cold and bad weather specially when exposed onboard. The rechargeable power sources/swappable rechargeable power sources, the first/second swappable rechargeable power sources [esp. including rechargeable batteries banks] can be thermally insulated. Thermal management systems provided to manage charging and/or discharging can include heating systems. The elements [e.g. solar collectors, etc.] can be preferably designed to cope with icing, etc.

No limitations are intended others than as described in the claims. The present invention is not limited to the described exemplary embodiments. It should be noted that various modifications and combinations of the elements of the SRS can be made without departing from the scope of the invention as defined by the claims.

The elements, components, integers, features, standards described in this specification and the used terminology reflect the state of knowledge at the time of the filling of this application and may be developed in the future [e.g. charging standards, charging interfaces, chargers, rechargeable power sources, energy storage elements, communication techniques, fuels, hydrogen production and hydrogen storage techniques, fuel cell technologies, etc.].

INDUSTRIAL APPLICABILITY

The present invention may provide effective and controllable sailing rigs driving at least partially sail driven water vessels which can be recreational or commercial ships.

The SRS can provide zero emission ships, bring economies to conventionally propelled ships, reduce emissions, improve hydrodynamical and aerodynamic properties of the ships, can be provided in complex charging systems [e.g. including (sailing) ferry boats providing power to vehicles transporting and charging electric vehicles, etc.].

The proposed swappability of the (first, second) swappable rechargeable power sources may bring benefits provided by swapping rapidity, ease of servicing, etc.

The power generators using renewable sources (arrays of solar cells, wind energy to electric energy converters), may provide power to be used for zero emission power production and supply by the SRS.

The SRS may be provided in modular systems. The proposed modularity and scalability may concern all elements of the SRS and may bring functional and financial benefits to the parties. Modular designs may use various degrees of modularity [e.g. component slottability, platform systems, holistic approach, etc.]. Modules may be catalogued.

I claim:

1. A sailing rig system for a sailing ship comprising one or more symmetric and/or assymetric airfoil sails: comprising one or more frames defining said one or more symmetric or assymetric airfoil sails, respectively and including an upper horizontal spar and a lower horizontal spar and a first edge and a second edge, said edges defined as a leading edge or a trailing edge, said sailing rig system characterized in that at least one of said one or more airfoil sails has a sail part reefable to a reefing edge, wherein said reefing edge is defined as said leading edge or said trailing edge, respectively and wherein said sail part is provided between said reefing edge and a mast.

2. The sailing rig system according to claim 1, wherein at least one said airfoil sail is selected from the group consisting of controllable sails, rotatable sails, pivotable sails, tiltable sails, trimmable sails, reefable sails, stowable sails, slidable sails, windable sails, guidable sails, weathervaning sails, wind tracking sails, sun tracking sails, freestanding sails, sails providing cambering means, sails providing reinforcing means, sails providing scaling means, sails providing boundary layer control means, sails providing sections and connections, transparent sails, vertical sails, horizontal sails, symmetric sails, asymmetric sails, square sails, circular arc sails, quadrilateral sails, tapered sails, flexible sails, semi-rigid sails, rigid sails, multiple-layers sails, or combinations thereof.

3. The sailing rig system according to claim 1, wherein said one or more frames further includes a rig component, wherein at least one said rig component is selected from the group consisting of, spars, panels, bolt ropes, layered components, lines, hollow components, aerodynamic components, components providing controlling means, components providing trimming means, components providing reefing means, components providing stowing means, components providing sliding means, components providing winding means, components providing guiding means components providing cambering means, components providing reinforcing means, components providing sealing means, components providing boundary layer control means, components providing sensors, components providing actuators, or combinations thereof.

4. The sailing rig system according to claim 1, further comprising a spar, wherein said one or more airfoil sails are coupled with said spar with a spar coupling, wherein at least one said spar coupling is selected from the group consisting of controlling couplings, rotating couplings, trimming couplings, reefing couplings, sliding couplings, winding couplings, guiding couplings, coaxial couplings, defined degrees of freedom couplings wind tracking couplings, sun tracking couplings, or combinations thereof.

5. The sailing rig system according to claim 4, further comprising one or more lateral sails, wherein at least one said lateral sail is selected from the group consisting of controllable sails, rotatable sails, pivotable sails, tiltable sails, trimmable sails, reefable sails, stowable sails, slidable sails, windable sails, guidable sails, weathervaning sails, sun tracking sails, wind tracking sails, freestanding sails, airfoil sails, said airfoil sails, vertical sails, horizontal sails, symmetric sails, asymmetric sails, square sails, circular arc sails, triangular sails, quadrilateral sails, tapered sails, rotor sails, flexible sails, semi-rigid sails, rigid sails, multiple-layers sails, spinnaker sails, gaff sails, lug sails, sails having an interacting airflow with said airfoil sails, or combinations thereof.

6. The sailing rig system according to claim 4, further comprising one or more fore-and-aft sails, wherein at least one said fore-and-aft sail is selected from the group consisting of controllable sails, rotatable sails, pivotable sails, tiltable sails, trimmable sails, reefable sails, stowable sails, slidable sails, windable sails, guidable sails, weathervaning sails, sun tracking sails, wind tracking sails, freestanding sails, airfoil sails, said airfoil sails, vertical sails, horizontal sails, symmetric sails, asymmetric sails, square sails, circular arc sails, triangular sails, quadrilateral sails, tapered sails, rotor sails, flexible sails, semi-rigid sails, rigid sails, multiple-layers sails, spinnaker sails, gaff sails, lug sails, sails having an interacting airflow with said airfoil sails, or combinations thereof.

7. The sailing rig system according to claim 4, further comprising one or more superposed sails, wherein at least one said fore-and-aft sail is selected from the group consisting of controllable sails, rotatable sails, pivotable sails, tiltable sails, trimmable sails, reefable sails, stowable sails, slidable sails, windable sails, guidable sails, weathervaning sails, sun tracking sails, wind tracking sails, freestanding sails, airfoil sails, said airfoil sails, vertical sails, horizontal sails, symmetric sails, asymmetric sails, square sails, circular arc sails, triangular sails, quadrilateral sails, tapered sails, irregular sails, rotor sails, flexible sails, semi-rigid sails, rigid sails, multiple-layers sails, spinnaker sails, gaff sails, lug sails, sails having an interacting airflow with said airfoil sails, or combinations thereof.

8. The sailing rig system according to claim 4, wherein said one or more airfoil sails provide sail twist.

9. The sailing rig system according to claim 4, further comprising said sailing ship, wherein said spar is coupled with a ship coupling, wherein at least one said ship coupling is selected from the group consisting of controlling couplings, rotating couplings, pivoting couplings, tilting couplings, trimming couplings, defined degrees of freedom couplings, weathervaning couplings, freestanding couplings, or combinations thereof.

10. The sailing rig system according to claim 9, wherein said sailing ship is further driven by a drive system, wherein at least one said drive system is selected from the group consisting of electric motors, hydrogen power drive systems, flexible sails drive systems, airfoil sails drive systems, rotor sails drive systems, internal combustion engines, nuclear power drive systems, regenerative power drive systems, or combinations thereof.

11. The sailing rig system according to claim 1, further comprising a sail actuator, wherein said one or more airfoil sails are coupled with said actuator, and wherein at least one said sail actuator is selected from the group consisting of AC motors, DC motors, linear motors, electromagnetic actuators, pneumatic actuators, hydraulic actuators, mechanical actuators, manual actuators, or combinations thereof.

12. The sailing rig system according to claim 1, further comprising one or more sail parts, wherein at least one said sail part is selected from the group consisting of central sail parts, lateral sail parts, controllable sail parts, trimmable sail parts, reefable sail parts, stowable sail parts, slidable sail parts, windable sail parts, guidable sail parts, cambering sail parts, flexible sail parts, semi-rigid sail parts, rigid sail parts, or combinations thereof.

13. The sailing rig system according to claim 12, further comprising one or more sail part actuators, wherein at least one said sail part is coupled with said one or more sail part actuators, and wherein at least one said sail part actuator is selected from the group consisting of laterally positioned actuators, centrally positioned actuators, winding axes, AC motors, DC motors, linear motors, electromagnetic actuators, pneumatic actuators, hydraulic actuators, mechanical actuators, manual actuators, or combinations thereof.

14. The sailing rig system according to claim 1, further comprising a power generator, wherein said one or more airfoil sails are coupled with said power generator, and wherein at least one said power generator is selected from the group consisting of arrays of solar cells, wind energy to electric energy converters, or combinations thereof.

15. The sailing rig system according to claim 1, further comprising a rechargeable power source/swappable rechargeable power source, wherein said one or more airfoil sails are coupled with said rechargeable power source/swappable rechargeable power source, and wherein at least one said rechargeable power source/swappable rechargeable power source is selected from the group consisting of rechargeable batteries, capacitors, energy storage elements, or combinations thereof.

16. The sailing rig system according to claim 1, further comprising a thermal management system, wherein said one or more airfoil sails are coupled with said thermal management system, and wherein at least one said thermal management system is selected from the group consisting of air tempering systems, liquid tempering systems, liquid tempering systems using offshore water as a thermal medium, tempering systems using phase change materials, tempering systems using heat pipes, or combinations thereof.

17. The sailing rig system according to claim 1, further comprising one or more rotor sails, wherein said one or more airfoil sails are coupled with said one or more rotor sails, and wherein at least one said rotor sail is selected from the group consisting of tangential flow rotor sails, cross-flow rotor sails, hybrid rotor sails, oblate rotor sails, truncated rotor sails, conical rotor sails, variable diameter rotor sails, rotor sails in substantially central position between said airfoil sails, rotor sails between said airfoil sails, rotor sails lateral to said airfoil sails, rotor sails in-line to said airfoil sails, rotor sails provided at leading edges of said airfoil sails, rotor sails provided at trailing edges of said airfoil sails, rotor sails provided between leading and trailing edges of said airfoil sails, rotor sails with fins, rotor sails with openings, rotor sails with shielding means, rotor sails having interacting airflows with sails, rotor sails having interacting airflows with said airfoil sails, rotor sails pivotably coupled or couplable with said sailing ships, or combinations thereof.

18. The sailing rig system according to claim 1, wherein said sailing rig system is provided as part of a modular system comprising: a module, wherein at least one said module is selected from the group consisting of said airfoil sails, said frames, sail cambering means, sail reinforcing means, sealing means, boundary layer control means, sail shielding means, sail sections and connections, rig components, spars, spar couplings, ship couplings, sail actuators, sail parts, sail part actuators, power generators, rechargeable power sources/swappable rechargeable power sources, thermal management systems, rotor sails, or combinations thereof, and wherein said power generators, said rechargeable power sources/swappable rechargeable power sources, said thermal management systems, said rotor sails are coupled with said airfoil sails, and wherein said module is modularly scalable and/or exchangeable and/or couplable with at least one element of said sailing rig system.

19. A sailing method for a sailing ship, said ship providing one or more symmetric and/or assymetric airfoil sails: comprising one or more frames defining said one or more symmetric or assymetric airfoil sails, respectively and including an upper horizontal spar and a lower horizontal spar and a first edge and a second edge, said first and second edges defined as a leading edge or a trailing edge; and one or more rotor sails, the method comprising the steps of:
sailing upwind using said one or more airfoil sails;
sailing downwind using said one or more airfoil sails;
sailing across wind using said one or more airfoil sails and/or said one or more rotor sails, wherein said steps can be combined and/or repeated.

* * * * *